United States Patent [19]

Brophy et al.

[11] Patent Number: 4,726,913
[45] Date of Patent: Feb. 23, 1988

[54] CONVERSION PROCESS

[75] Inventors: John H. Brophy, Camberley; Richard P. Manning, Chertsey, both of England

[73] Assignee: The British Petroleum Company p.l.c., London, England

[21] Appl. No.: 70,081

[22] Filed: Jul. 6, 1987

Related U.S. Application Data

[63] Continuation of Ser. No. 785,590, Oct. 8, 1985, abandoned.

[30] Foreign Application Priority Data

Oct. 18, 1984 [GB] United Kingdom ............... 8426344

[51] Int. Cl.[4] .......................... C01B 3/28; C01B 3/30
[52] U.S. Cl. ..................................... 252/373; 585/540
[58] Field of Search .......................... 252/373; 585/540

[56] References Cited

U.S. PATENT DOCUMENTS

| 2,679,540 | 5/1954 | Berg et al. |
| 2,679,541 | 5/1954 | Berg et al. |
| 2,942,958 | 6/1960 | Dwyer |
| 3,022,148 | 2/1962 | James |
| 3,138,438 | 6/1964 | Peras |
| 3,414,247 | 12/1968 | Sama |
| 3,541,179 | 11/1970 | Okagami et al. |

Primary Examiner—Howard T. Mars
Attorney, Agent, or Firm—Morgan & Finnegan

[57] ABSTRACT

Process for the production of synthesis gas and hydrocarbons in which a saturated hydrocarbon and an oxygen containing gas having a ratio of hydrocarbon to oxygen of greater than the stoichiometric ratio for complete combustion are introduced together with hydrogen into a bed of particulate material. The upward flow rate of the gases is sufficiently large to fluidize or to cause a spouting action of the bed material. The hydrocarbon, oxygen containing gas and hydrogen are ignited and reacted together and the products of the reaction are withdrawn.

20 Claims, 1 Drawing Figure

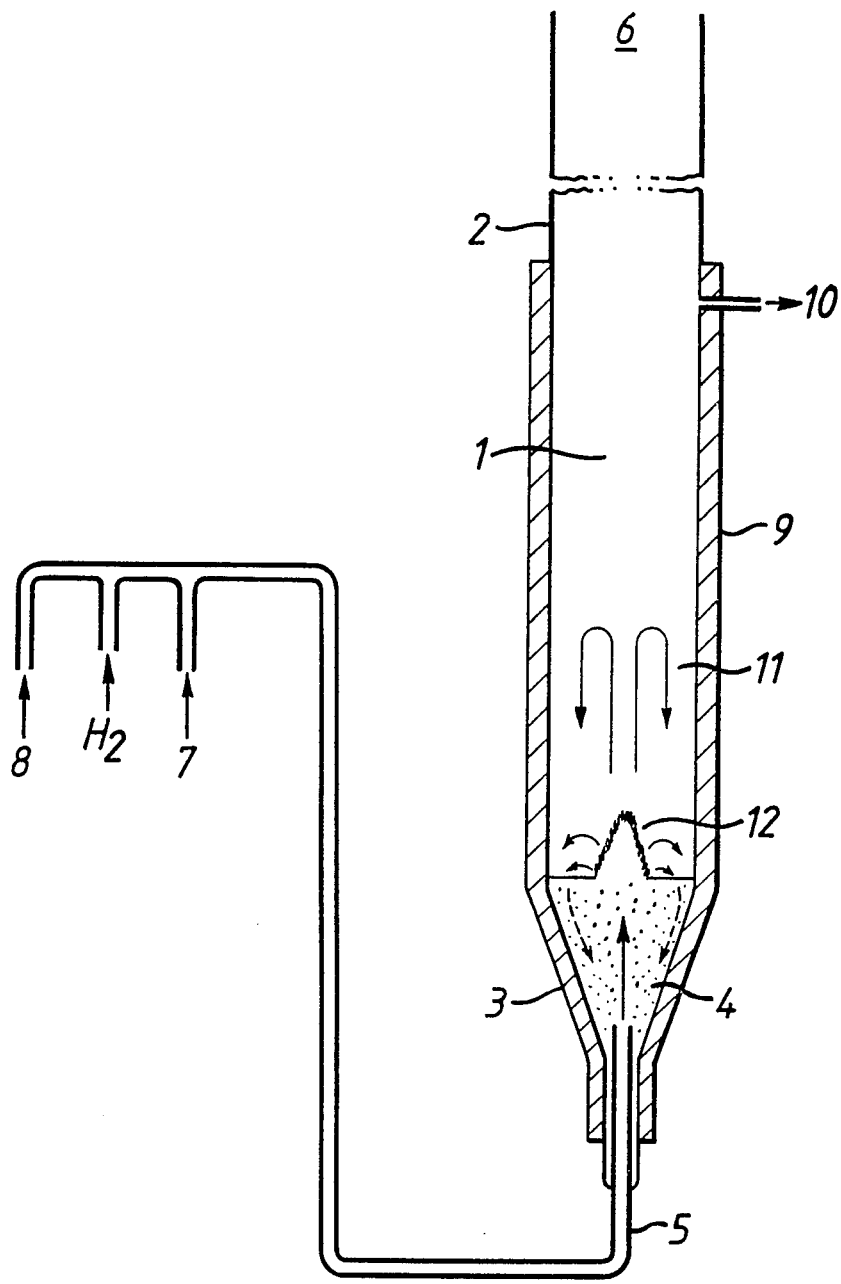

CONVERSION PROCESS

This is a continuation of co-pending application Ser. No. 785,590, filed on Oct. 8, 1985, now abandoned.

The present invention relates to a process for the production of a mixture of gases comprising carbon monoxide and hydrogen (hereinafter referred to as synthesis gas) and hydrocarbons in a particulate bed reactor.

The use of fluidised beds for various applications is well known. The fluidisation process involves flowing gas through a bed of particulate material at a rate at which the bed becomes highly turbulent and rapid mixing of the particles occurs. Materials may be introduced to and be reacted in the bed.

Spouted bed technology comprises passing a high velocity stream of gas vertically upwards through a mass of solid particles. The high velocity gas stream causes the particles to ascend rapidly in a hollowed central spout within the bed. In addition to particle motion within the spout there is some particle back mixing in the area surrounding the spout giving a particle circulation pattern outside the spout. The feed gas may have sufficient upward flow to create a fountain of particles above the bed or in a deeper bed may give a very high circulation rate of solid particles within the bed. In each case a cycle of solid particle movement is established. A review of developments in spouted bed technology appears in the Canadian Journal of Chemical Engineering, Volume 52, page 129, 1974.

Our copending European patent application No. 85302279 discloses a process for the production of synthesis gas and higher hydrocarbons in which (a) a saturated hydrocarbon and an oxygen containing gas having a ratio of hydrocarbon to oxygen of greater than the stoichiometric ratio for complete combustion are introduced into a bed of an inert particulate material, (b) the upward flow rate of the hydrocarbon/oxygen containing gas stream being sufficiently large to fluidise or to cause a spouting action of the bed material, whereby at least a part of the particulate material is thrown up above the bed surface and subsequently falls back into the bed, (c) the hydrocarbon and oxygen containing gas being ignited and reacted together and (d) the products of the reaction being withdrawn.

The present invention relates to a development of the aforementioned process.

Thus according to the present invention there is provided a process for the production of synthesis gas and hydrocarbons in which (a) a saturated hydrocarbon and an oxygen containing gas having a ratio of hydrocarbon to oxygen of greater than the stoichiometric ratio for complete combustion are introduced together with hydrogen into a bed of particulate material (b) the upward flow rate of the gases being sufficiently large to fluidise or to cause a spouting action of the bed material (c) the hydrocarbon, oxygen containing gas and hydrogen being ignited and reacted together and (d) the products of the reaction being withdrawn.

The invention is intended to include a process in which the upward flow rate of the hydrogen, hydrocarbon and oxygen containing gas causes fluidisation of the bed material, or a spouting action of the bed material in which a fountain of particles is formed above the bed surface or fluidisation with surface bubbling of the bed material. The invention also includes a process comprising internal spouting of the bed material.

The hydrocarbon and oxygen containing gas and hydrogen may be pre-mixed before being introduced into the bed through a nozzle. Alternatively, the reactant gases may be allowed to mix at the point of injection to the bed or may be fed separately to the bed. The saturated hydrocarbon is preferably a gaseous paraffinic hydrocarbon such as substantially pure methane or ethane or mixtures of hydrocarbons comprising substantial proportions of methane and/or ethane, for example those obtained from natural hydrocarbon gas reservoirs which may also contain carbon dioxide. Also the saturated hydrocarbon may be propane, butane or even higher hydrocarbons. The oxygen containing gas may be for example air or an air/oxygen mixture. Also pure oxygen may be the oxygen containing gas.

The hydrocarbon and/or the oxygen containing gas and hydrogen may be preheated, if required prior to introduction to the bed.

· The reactor may also be equipped with ancillary heating means, for example, heating coils in the bed or by direct fired heating of the reactor walls.

The preferred composition of the hydrogen, saturated hydrocarbon/oxygen containing gas mixture is pressure dependent. At atmospheric pressure, the preferred hydrocarbon/oxygen molar ratio is 1.1 to 5 times the stoichiometric ratio of hydrocarbon/oxygen for complete combustion to carbon dioxide and water. The preferred molar ratio of $H_2$ to $O_2$ is 5 or less. These limits are extendible if operation at system pressures of greater than atmospheric are envisaged or if the feed gases are pre-heated. Commercial reactor systems would probably be operated at pressures above atmospheric and up to 50 bar or even higher.

The particulate bed material may be an inert temperature resistant refractory material which may include firebrick, quartz, carborundum, zirconia, silicon carbide, ceramics and certain forms of carbon e.g. high density coke may be used. It is also envisaged that particulate material having catalytic properties, such as alumina, may be used. The shape of the particulate bed material may be, for example, spherical, cylindrical, or amorphous. The particle size may vary from 0.01 to 10 mm in diameter dependent upon the particle density, the diameter of the reactor and feed inlet and the feed gas flow rate. The particle size distribution for spouted bed operation is preferably as uniform as possible.

The materials of construction of the reactor vessel may be for example steel, quartz, or refractory material dependent upon material availability and location and size of the reactor. The reactor may be insulated to reduce heat loss.

The reaction may be initiated in a number of ways. For example, the particulate material may be pre-heated by igniting and burning a near stoichiometric mixture in the bed until the bed temperature is great enough to sustain the reaction of the hydrogen and excess stoichiometric hydrocarbon/oxygen mixtures. A typical steady state bed temperature is of the order 500°–1500° C.

The products of the reaction are preferably withdrawn from above the bed. The preferred products are unsaturated $C_2$ hydrocarbons such as acetylene, ethylene, higher olefins, aromatics and synthesis gas (carbon monoxide and hydrogen).

The reactor vessel containing the bed of particulate material may be shaped so as to encourage recirculation of the bed particles in a vertical direction. For spouted bed operation with a single inlet feed nozzle, the preferred shape of the base portion is conical. The cone angle measured from the vertical is preferably from 10° to 40°.

Steam or water may be injected into the bed together with the reactant gases and/or injected into the product gases as a quench. This is particularly desirable when operating at pressures greater than one bar. It is believed that the injection of steam or water (quenching) reduces the temperature of the product gases and stops or reduces further reaction to less useful products and/or soot. An alternative mode of quench is envisaged if it is required to increase the amount of unsaturated hydrocarbons in the product gases. This mode comprises the injection of, for example, a liquid saturated hydrocarbon e.g. propane, butane or gasoline, into the hot product gases and to thereby increase the content of light unsaturated hydrocarbons e.g. ethylene, acetylene in the product gases.

It is also envisaged that for the conversion of large quantities of hydrocarbon, hydrogen and oxygen, an array of reactors could be used. Also a single bed containing one or more adjacent inlet nozzles may be used.

It is also possible if desired to introduce further gaseous hydrocarbons, oxygen containing gases and hydrogen, to the bed through a further nozzle or nozzles. This further feed may have the same composition as the primary feed or may be different. The further nozzle or nozzles may direct the further feed in a counter current, parallel, perpendicular or other direction relative to the primary gas feed direction.

The invention will now be described by way of example only and with reference to the accompanying drawing.

BRIEF DESCRIPTION OF THE DRAWING

The drawing shows a schematic layout of a particulate bed reactor and ancillary equipment.

The reactor 1 takes the form of an elongate quartz column 2 having a conical base portion 3, the angle of the cone from the vertical being 20°. The base portion of the reactor contains a particulate material 4, in the present examples having a particle size of the order 1-1.5 mm diameter. The base of the column is adapted to receive a nozzle 5 for the introduction of reactants. The nozzle outlet may be adjusted vertically within and above the bed of particulate material. The upper portion 6 of the reactor is open to form an outlet for withdrawal of the product gases. A line 10 enables samples of the products to be withdrawn from the product gas stream.

The nozzle 5 is connectable to a supply of air 7 or other oxygen containing gas under appropriate pressure and to a supply 8 of methane and hydrogen. A suitable supply may comprise cylinders of hydrocarbon e.g. methane, air and hydrogen linked to the nozzle through a mixer and gas pressure and flow rate measuring devices such as manometers and rotameters (now shown).

The reactor 1 is lagged with a suitable insulating material 9.

A number of techniques may be used for start up of the reactor. In the present example, the ignition source was a gas burner (not shown) located at the outlet portion 6 of the column.

During start up of the reactor, a pre-mixed gas stream of hydrocarbon and air was passed under pressure to the nozzle 5 in the base portion 3 of the column. The velocity of the gas stream was sufficient to cause a vertical spout 11 of bed particles above the bed.

The gas stream used was very fuel rich and consequently the gas mixture was ignited by the gas burner and a flame stabilised at the exit of the reactor. The air flowrate was increased, bringing the mixture closer to stoichiometric, until the flame began to move slowly down the reactor. A flame 12 was stabilised at the surface of the bed and the fuel flowrate reduced slightly to obtain a more stable flame. When the bed temperatures had equilibrated, the fuel flowrate was increased and a low flowrate of oxygen was added to the bed. The air flowrate was then reduced and both the fuel and the oxygen increased to maintain the stable flame and the spouting action of the bed. This procedure was repeated until the feed composition was entirely fuel and oxygen. The total feed mixture was always maintained on the rich side of stoichiometric. Several runs were then carried out in which hydrogen was introduced into the reactor together with the hydrocarbon and oxygen.

The constituents and composition of the reactant gases were ascertained by means of conventional techniques. This procedure was repeated for a number of fuel rich hydrocarbon/oxygen/hydrogen reactant compositions. The products obtained from the reaction may include carbon monoxide and hydrogen (synthesis gas), acetylene, and ethylene. Table 1 summarises the effect of the co-feed of hydrogen with various particulate bed materials. Examples 1 to 5 show details of the process without hydrogen co-feed. Examples 6 to 10 shows details of the process using hydrogen co-feed showing increasing selectivity to unsaturated $C_2$'s and higher hydrocarbons and a decrease or elimination of carbon formation.

The results of similar experiments using ethane in place of methane as feedstock in a spouted bed reactor are shown in Table 2. The hydrogen co-feed has beneficial effects on the conversion process with increased selectivity to $C_2$ and higher hydrocarbons and reduced carbon formation.

Further experiments performed in a fluidised bed reactor using methane as feedstock are shown in Table 3. The results show that hydrogen co-feed has similar beneficial effects on the conversion process with increased selectivity to $C_2$ and higher hydrocarbons and reduced carbon formation.

TABLE 1

Feed Tube Diameter = 1.5 mm

| Bed Material | Expt No | Feed Ratios (by vol) $CH_4$ $O_2$ | $H_2$ $O_2$ | GHSV $(hr^{-1})$ | % $CH_4$ Conversion | % Selectivity (C-mol) $C_2^+$ | CO | $CO_2$ | soot | % Yield of $C_2^+$ (C-mol) |
|---|---|---|---|---|---|---|---|---|---|---|
| Crushed Firebrick | 1 | 1.64 | 0 | 17700 | 82 | 36.8 | 47.2 | 6.2 | 9.7 | 30 |
|  | 6 | 1.64 | 1.59 | 20800 | 69 | 49.8 | 45.8 | 4.4 | 0 | 35 |
| Quartz Chips | 2 | 1.62 | 0 | 17700 | 92 | 33.5 | 57.5 | 7.5 | 1.4 | 31 |
|  | 7 | 1.63 | 1.63 | 20800 | 79 | 48.7 | 46.8 | 4.8 | 0 | 38 |
| Silicon Carbide | 3 | 1.62 | 0 | 26200 | 90 | 36.2 | 53.2 | 6.7 | 3.9 | 33 |
|  | 8 | 1.60 | 1.60 | 33800 | 76 | 51.0 | 44.6 | 4.4 | 0 | 39 |
| Alumina | 4 | 1.78 | 0 | 26400 | 67 | 26.5 | 56.7 | 13.8 | 3.0 | 18 |

TABLE 1-continued

Feed Tube Diameter = 1.5 mm

| | | | | | | | | | |
|---|---|---|---|---|---|---|---|---|---|
| Spheres | 9 | 1.74 | 1.57 | 26400 | 45 | 32.0 | 56.4 | 11.6 | 0 | 14 |
| Zirconia | 5 | 1.59 | 0 | 69600 | 92 | 30.7 | 58.3 | 6.9 | 4.0 | 28 |
| Spheres | 10 | 1.64 | 2.27 | 1080000 | 66 | 52.9 | 43.3 | 3.3 | 0.5 | 35 |

| Bed Material | Expt No | Dry Exhaust Gas Composition (soot free) (% vol) | | | | | | | | |
|---|---|---|---|---|---|---|---|---|---|---|
| | | $CH_4$ | $N_2$* | $H_2$ | CO | $CO_2$ | $C_2H_2$ | $C_2H_4$ | $C_2H_6$ | $C_{3-6}$ aliphatic | aromatic |
| Crushed Firebrick | 1 | 10.6 | 4.6 | 49.9 | 23.3 | 3.1 | 5.89 | 2.24 | 0 | 0.15 | 0.23 |
| | 6 | 13.7 | 4.4 | 57.8 | 14.9 | 1.5 | 4.73 | 2.60 | 0.04 | 0.14 | 0.16 |
| Quartz Chips | 2 | 4.1 | 3.4 | 55.4 | 26.4 | 3.4 | 4.69 | 2.43 | 0.03 | 0.02 | 0.16 |
| | 7 | 8.7 | 3.7 | 63.2 | 15.3 | 1.6 | 4.47 | 2.74 | 0.05 | 0.10 | 0.18 |
| Silicon Carbide | 3 | 5.1 | 4.0 | 52.7 | 26.4 | 3.3 | 5.64 | 2.49 | 0.03 | 0.14 | 0.18 |
| | 8 | 10.6 | 5.3 | 59.7 | 14.8 | 1.5 | 5.12 | 2.62 | 0.04 | 0.12 | 0.17 |
| Alumina Spheres | 4 | 19.4 | 5.4 | 42.5 | 22.5 | 5.5 | 2.70 | 1.32 | 0.03 | 0 | 0.34 |
| | 9 | 26.6 | 7.5 | 47.8 | 12.4 | 2.6 | 1.99 | 1.08 | 0.03 | 0 | 0.14 |
| Zirconia Spheres | 5 | 4.5 | 5.5 | 52.7 | 26.9 | 3.2 | 4.20 | 2.44 | 0.09 | 0 | 0.12 |
| | 10 | 11.9 | 7.9 | 59.5 | 10.8 | 2.0 | 5.85 | 1.85 | 0 | 0.10 | 0.10 |

(*In most experiments, the total feed contained about 5% of nitrogen by volume)

TABLE 2

| Bed Material | GHSV ($hr^{-1}$) | Feed Ratios (by vol) | | % $C_2H_6$ Conversion | C-mol Selectivity of products | | | | | Reactor Temp (°C.) |
|---|---|---|---|---|---|---|---|---|---|---|
| | | $C_2H_6$/$O_2$ | $H_2$/$O_2$ | | $C_2^{+**}$ | CO | $CO_2$ | $CH_4$ | soot | |
| Alumina | 60000 | 1.81 | 0 | 95 | 56.6 | 27.1 | 3.7 | 12.6 | 0 | 887 |
| Spheres | 60000 | 1.83 | 1.70 | 93 | 60.2 | 22.8 | 2.9 | 14.1 | 0 | 865 |
| Zirconia | 95000 | 1.15 | 0 | 100 | 30.6 | 45.1 | 2.8 | 14.9 | 6.6 | 959 |
| Spheres | 95000 | 1.15 | 0.91 | 99 | 37.4 | 42.4 | 2.4 | 17.8 | 0 | 846 |

| Bed Material | Dry Soot Free Exhaust Composition (% by vol) | | | | | | | | | | |
|---|---|---|---|---|---|---|---|---|---|---|---|
| | $H_2$ | $N_2$* | CO | $CO_2$ | $CH_4$ | $C_2H_6$ | $C_2H_4$ | $C_2H_2$ | $C_3$'s | $C_4$'s | arom |
| Alumina | 38.8 | 0 | 22.7 | 3.1 | 10.5 | 2.3 | 20.9 | 1.2 | 0.3 | 0.4 | 0.1 |
| Spheres | 53.1 | 0 | 14.6 | 1.9 | 9.0 | 2.6 | 17.2 | 0.9 | 0.2 | 0.3 | 0.1 |
| Zirconia | 45.4 | 3.9 | 29.6 | 1.9 | 9.8 | 0.1 | 3.6 | 5.1 | 0.1 | 0.1 | 0.3 |
| Spheres | 51.2 | 4.3 | 23.4 | 1.3 | 9.8 | 0.2 | 5.7 | 3.5 | 0.1 | 0.1 | 0.3 |

**$C_2^+$ hydrocarbons with carbon number 1 exclusive of ethane
*In most experiments, the total feed contained about 5% of nitrogen by volume.

TABLE 3

| | G.H.S.V ($hr^{-1}$) | Feed Ratios (Mole Ratio) | | % Conversion of $CH_4$ (C-mol) | % Carbon Molar Selectivity (C-mol) | | | | Bed Temperature (°C.) |
|---|---|---|---|---|---|---|---|---|---|
| | | $CH_4$/$O_2$ | $H_2$/$O_2$ | | $C_2^+$ | CO | $CO_2$ | soot | |
| Fluidised Bed | 21200 | 1.65 | 1.67 | 37.4 | 40.2 | 54.2 | 5.5 | 0 | 1120 |
| Fluidised Bed | 21200 | 1.75 | — | 62.8 | 30.0 | 56.1 | 7.6 | 6.4 | 1151 |

(Bed material - particulate zirconia)

We claim:

1. A process for the production of hydrogen and carbon monoxide containing synthesis gas and hydrocarbons in which (a) a saturated hydrocarbon and an oxygen containing gas having a ratio of hydrocarbon to oxygen of greater than the stoichiometric ratio for complete combustion are introduced together with hydrogen into a bed of particulate material, (b) the upward flow rate of the gases being sufficiently large to cause a spouting action of the bed material, (c) the hydrocarbon, oxygen containing gas and hydrogen being ignited and reacted together and (d) the products of the reaction being withdrawn.

2. A process according to claim 1 in which the upward flow rate of the hydrogen, hydrocarbon and oxygen containing gas stream forms a fountain of particles above the bed surface, the particles falling back into the bed.

3. A process according to claim 1 in which two or more of the hydrogen, hydrocarbon and oxygen containing gas feeds are pre-mixed prior to introduction to the bed.

4. A process according to claim 1 in which the saturated hydrocarbon comprises methane, ethane, propane, butane, or natural gas.

5. A process according to claim 1 in which the oxygen containing gas is oxygen or air.

6. A process according to claim 1 in which one or more of the hydrogen, hydrocarbon and the oxygen containing gas feeds are pre-heated prior to introduction to the bed.

7. A process according to claim 1 in which the composition of hydrocarbon gas and oxygen containing gas is 1.1 to 5 times the stoichiometric ratio of hydrocarbon/oxygen for complete combustion.

8. A process according to claim 1 in which the molar ratio of hydrogen to oxygen is 5 or less.

9. A process according to claim 1 operated at a pressure of greater than atmospheric pressure.

10. A process according to claim 1 in which the bed of particulate material comprises firebrick, quartz, alumina, carborundum, zirconia, silicon carbide, ceramic or forms of carbon.

11. A process according to claim 10 in which the particulate size diameter is 0.01–10 mm.

12. A process according to claim 1 in which the bed has ancillary heating means.

13. A process according to claim 1 in which the reaction is initiated by preheating the bed material by igniting and burning a near stoichiometric hydrocarbon/oxygen containing gas mixture in the bed until the bed temperature is sufficient to sustain combustion of a hydrogen, hydrocarbon/oxygen containing gas mixture having a ratio of hydrocarbon to oxygen of greater than the stoichiometric ratio for complete combustion.

14. A process according to claim 1 in which the reaction is quenched.

15. A process according to claim 14 in which the reaction is quenched by the introduction of steam or water.

16. A process according to claim 14 in which the reaction is quenched by the introduction of a liquid saturated hydrocarbon into the hot product gas.

17. A process according to claim 1 in which a further hydrocarbon gas, hydrogen, or oxygen is introduced to the bed.

18. A process according to claim 17 in which the further hydrocarbon gas is different in composition or constitution from the hydrocarbon gas.

19. A process according to claim 17 in which the further hydrocarbon gas is introduced parallel, perpendicular, or countercurrent to the hydrocarbon/oxygen containing gas mixture.

20. A process according to claim 1 which is carried out in one or more particulate beds.

* * * * *